(12) United States Patent
Knauerhase et al.

(10) Patent No.: US 7,263,368 B2
(45) Date of Patent: Aug. 28, 2007

(54) ANTICIPATION OF COMMUNICATION CONNECTIVITY CHANGES FOR MOBILE DEVICES

(75) Inventors: Robert C. Knauerhase, Portland, OR (US); Nikhil M. Deshpande, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 443 days.

(21) Appl. No.: 10/112,007

(22) Filed: Mar. 28, 2002

(65) Prior Publication Data

US 2004/0203998 A1 Oct. 14, 2004

(51) Int. Cl.
*H04M 1/00* (2006.01)
(52) U.S. Cl. .............................. 455/456.1; 455/456.6; 455/432.1
(58) Field of Classification Search ........ 455/440–444, 455/456.1–456.3, 456.5–456.6, 436–437, 455/432.1–433, 450, 452.1–454, 455, 445; 370/331–334
See application file for complete search history.

(56) References Cited

U.S. PATENT DOCUMENTS

| | | | |
|---|---|---|---|
| 6,327,471 B1 * | 12/2001 | Song | 455/440 |
| 6,351,642 B1 * | 2/2002 | Corbett et al. | 455/442 |
| 6,385,454 B1 * | 5/2002 | Bahl et al. | 455/450 |
| 6,487,393 B1 * | 11/2002 | Davenport et al. | 455/456.6 |
| 6,553,232 B1 * | 4/2003 | Shaffer et al. | 455/440 |
| 6,690,947 B1 * | 2/2004 | Tom | 455/556.1 |
| 6,711,408 B1 * | 3/2004 | Raith | 455/436 |
| 6,748,223 B2 * | 6/2004 | Fraccaroli | 455/456.1 |
| 6,871,139 B2 * | 3/2005 | Liu et al. | 455/437 |

* cited by examiner

*Primary Examiner*—Temica Beamer
(74) *Attorney, Agent, or Firm*—Blakely, Sokoloff, Taylor & Zafman LLP (57) ABSTRACT

According to an embodiment of the invention, the location of a mobile device and a direction in which the mobile device is moving are determined. Communications service changes for the mobile device are anticipated based at least in part on the location of the mobile device and direction in which the mobile device is moving.

34 Claims, 5 Drawing Sheets

Possible Communications Links
for a Mobile Device

Movement of Mobile Device
Through Regions With
Different Communications Services

ANTICIPATION OF COMMUNICATION CONNECTIVITY CHANGES FOR MOBILE DEVICES

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software and data as described below and in the drawings hereto: Copyright© 2002, Intel Corporation, All Rights Reserved.

FIELD

An embodiment of the invention relates to communications in general, and more specifically to anticipation of communication connectivity changes for mobile devices.

BACKGROUND

As more communications networks are established, mobile devices have been developed that have the ability to communicate in multiple networks. Networks, including wireless local area networks and other wireless systems, generally have certain regions in which signals may be transmitted and received and thus the particular networks that may be accessed by a mobile device change as the device is moved from one point to another. Further, the communications networks available to a mobile device may vary greatly with regard to applications supported, communication technology used, bandwidth availability, and signal strength. In addition, there may be some locations in which no communications service is available to a mobile device. A mobile device, which may take many forms, may be transported to many different regions, each with different communications options.

In conventional communications systems, the availability and quality of communications services for a device are largely determined on a trial-and-error basis. A conventional communications system may detect changes in service for a mobile device as such changes occur, but the system does not anticipate the changes before the changes occur. In a conventional system, a user of a mobile device may move towards an area without any service coverage or towards an area in which a different transmitter is required, but the user will not be warned of the change in service until the original service is lost entirely.

Multiple services may be available to a mobile device in a particular region, but a conventional mobile device is generally required to search for each service to determine what communication connections may be made. A conventional service does not anticipate what services will be available in a region as the mobile device moves towards the region, and thus a mobile device or the user of such a device needs to have knowledge of possible communications links in order to choose the best service for a particular task. A conventional communications system may detect that a mobile device is connected to a network. However, the system may not have the capability of determining the physical location and direction of travel of the mobile device, and does not have the capability of using such information to anticipate changes in communications connectivity.

BRIEF DESCRIPTION OF THE DRAWINGS

The invention may be best understood by referring to the following description and accompanying drawings that are used to illustrate embodiments of the invention. In the drawings.

DETAILED DESCRIPTION

A method and apparatus are described for anticipation of communication connectivity changes for mobile devices. According to an embodiment of the invention, the location and direction of travel of a mobile device are periodically determined. Based at least in part on such information, changes in communication services and network availability for the mobile device are anticipated.

In the following description, for the purposes of explanation, numerous specific details are set forth. However, it is understood that embodiments of the invention may be practiced without these specific details. In other instances, well-known circuits, structures, techniques, and devices have not been shown in detail in order not to obscure the understanding of this description.

Embodiments of the invention include various processes, which will be described below. The processes may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Terminology

Before describing an exemplary environment in which various embodiments of the present invention may be implemented, some terms that will be used throughout this application will briefly be defined:

As used herein, "optimal connection" means the best possible network connection for a device based on certain factors. An optimal connection in a particular circumstance may include, but is not limited to, a communication link that provides the fastest connection, that is least likely to be lost or terminated, that provides the easiest access to certain data, that provides access to a certain needed application, that provides the least expensive operation, or that has security characteristics that allow or best fit a particular application.

As used herein, "mobile device" means any device that is mobile and that is capable of communication functions. A mobile device includes, but is not limited to, a personal digital assistant (PDA) with communication functions; a mobile computer with wireless network access, including a laptop or notebook computer; a computer installed in a motor vehicle that may be connected to a network; a cellular telephone; and other such devices.

Under an embodiment of the invention, a mobile device may communicate utilizing one or more networks. According to the embodiment, the location and direction of travel of the mobile device are determined. Based on the location and direction of travel, changes in communication connectivity for the mobile device are anticipated. According to certain embodiments, actions may be taken to accommodate the anticipated connectivity changes.

The types of connectivity changes that may be anticipated may vary depending on the individual circumstances and the particular embodiment of the invention. Under a particular embodiment, the movement of a client device towards a region in which there is no communication service available or in which communication services may be limited or degraded may be detected. Under another embodiment, the movement of the device towards a region that will require or allow the mobile device to transfer to a different communication service may be detected.

The location and direction of a mobile device may be determined by any known method. For example, under an embodiment of the invention the location and direction of the device could be generated automatically by global positioning satellite (GPS), by cellular triangulation, or by detection of a local transmitter. Under other embodiments, locations may be entered by the user. In one example, a user of a mobile device may enter locations into the mobile device as the device is moved, at one point in time entering a first location and at a later point in time entering a second location. The communications system may use the entered information to determine the current location and the direction in which the mobile device is moving, thereby allowing for anticipation of service changes if the device continues moving in the same direction. Under another embodiment of the invention, a user of a mobile device may input a direction or destination into the mobile device and the information is then used to determine the anticipated change in service. For example, a person commuting by airplane may input the destination airport into a mobile device, thereby allowing the mobile device to determine communications service options at the destination, and then to access a service accordingly as soon as the user arrives at the destination airport.

Under an embodiment of the invention, the current location and direction of travel of a mobile device is determined periodically. The location and direction data updates the presence information for the mobile device, which is then used to periodically look ahead on a service coverage map for anticipated changes in communications connectivity.

Under an embodiment of the invention, the speed of motion of a mobile device is also determined, in addition to the location and the direction of motion of the device. Under the embodiment, the speed of motion of the device may be used to determine how imminent changes to connectivity are. For example, if a mobile device is in motion at a walking pace towards an area in which there is no communications service coverage, the circumstances may not warrant any action or may require only non-urgent advisories until the device is very close to the no service area. However, if the same device is contained in a motor vehicle operating at highway speeds, loss of coverage would occur more quickly and thus the situation may warrant more immediate action or more urgent notification.

Figure 1:
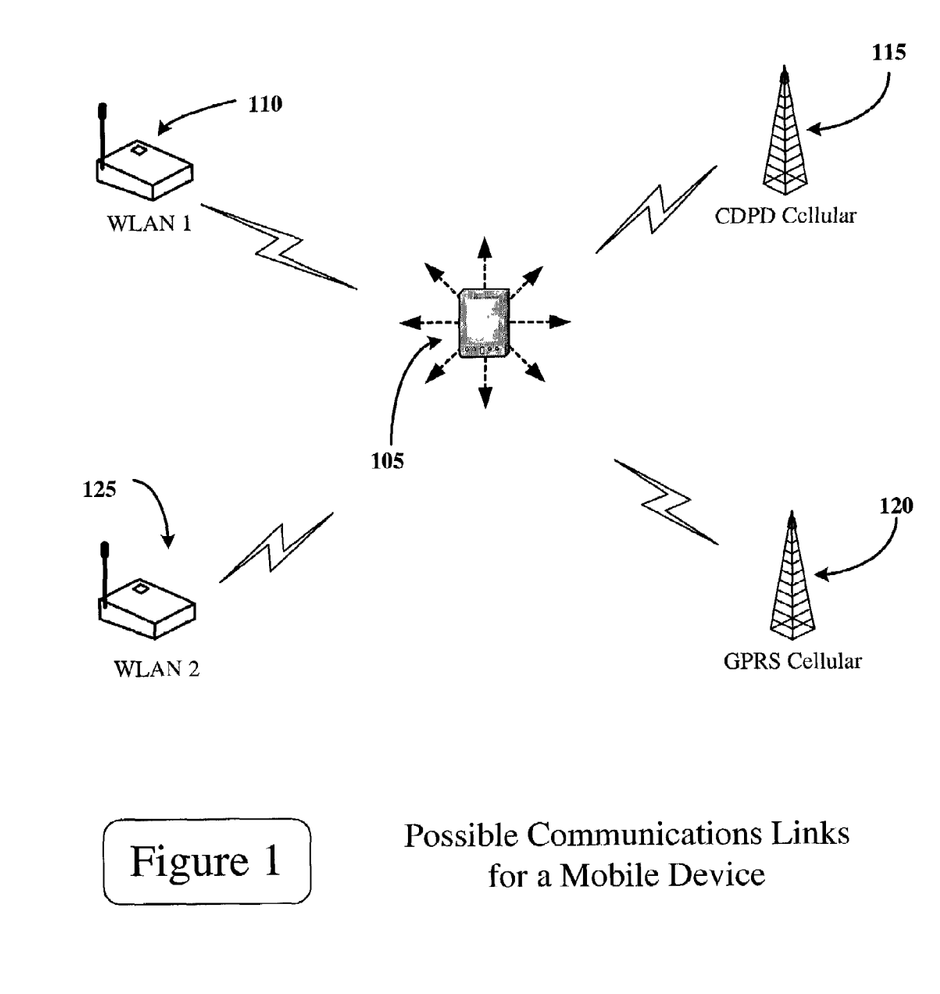
FIG. 1 illustrates possible communications network links for a mobile device.

FIG. 1 is an illustration of one example of possible network connections for a mobile device. In this example, mobile device 105 may move in any direction. In FIG. 1 and the other figures provided herein the mobile device is illustrated as a personal digital assistant (PDA) for simplicity, but any type of mobile device may be utilized. If the mobile device 105 moves towards a first access point (AP) 110, the device may be able to communicate with a first wireless local area network (WLAN 1). If the mobile device 105 moves towards a second access point 125, the device may be able to communicate with a second wireless access network (WLAN 2), which may not be compatible with the WLAN 1. If the mobile device 105 moves towards a first cellular antenna 115, the device may be able to communicate utilizing cellular digital packet data (CDPD) communications technology. If the mobile device 105 moves towards a second cellular antenna 120, the device may be able to communicate utilizing general packet radio service (GPRS) communications technology. In certain embodiments, these communications options for a mobile device will overlap in certain areas, thus requiring that a decision be made regarding which service to utilize with the device. In the example shown in FIG. 1, it is possible that mobile device 105 is located in a region that allows communication with any or all of the illustrated communication networks.

Under an embodiment of the invention, a service coverage map for the mobile device is used to anticipate changes in communications connectivity. The service coverage map is a collection of data that contains information regarding the communications services that are available in regions that are included within the map, thereby linking possible locations of a mobile device to available services for such locations. The communication services available for a mobile device at any particular location may be derived from the coverage map. Under an embodiment of the invention, the location and direction of travel for a mobile device are used to determine the locations or regions towards which the mobile device is moving. Under an embodiment of the invention, the location and direction information is utilized to look ahead on the coverage map and determine anticipated changes in communications service. Described in an alternative manner, an expected future destination for the mobile device is determined using the current location and direction of travel of the mobile device, and communication service coverage information for the expected future destination are obtained from the coverage map. Under a particular embodiment, the speed of travel of the mobile device is also determined and this speed is utilized together with the current location and direction of travel to determine what regions in the coverage map will be relevant for a mobile device. One example of regions for communications services are cells for cellular communications technology, but many other types of regions for different types of communications services and networks may be present.

Figure 2:
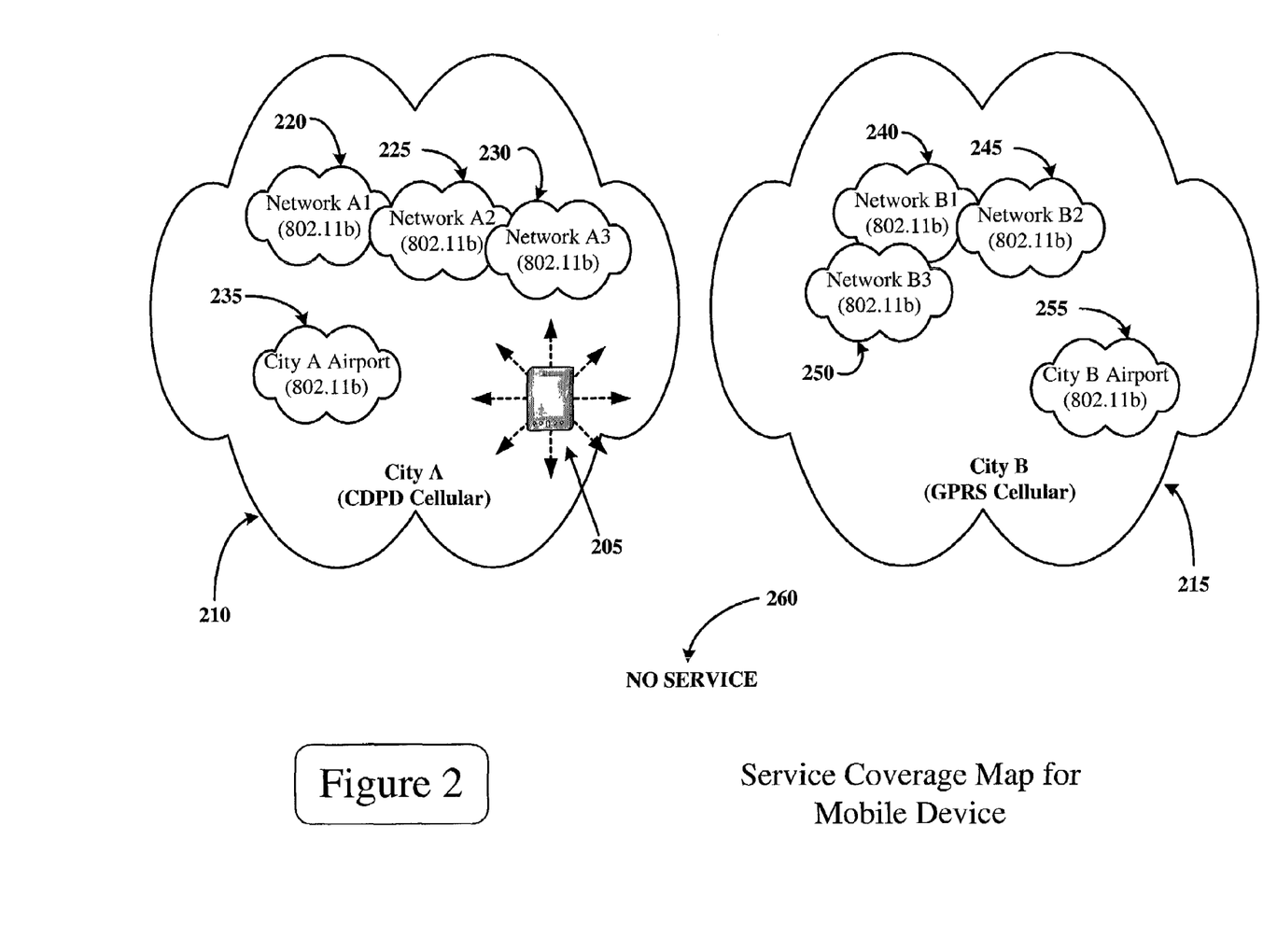
FIG. 2 illustrates a communications service coverage map for a mobile device.

FIG. 2 illustrates a service coverage map for a mobile device. Note that this figure is proved for purposes of illustration and is not intended to represent the format or content of an actual coverage map for a mobile device. In FIG. 2, a mobile device 205 may move in any direction. The movement of mobile device 205 may change the communications services available to the device. For example, the mobile device 205 is shown to be located in city A 210, which in this example is served by a CDPD cellular service. Note that the city itself may be divided into a number of cells for the cellular service, which cells comprise another example of possible regions for communications services. Within the city, there may be numerous other communications networks. In this example, network A1 220, network A2 225, and network A3 230, are wireless local area networks that may be accessed by mobile device 205 if the device moves into the geographic areas served by these networks.

As shown in FIG. 2, the various networks may overlap in coverage. If mobile device 205 moves near one or more of these networks, the device may, for example, inform the user of the device that the services provided by these networks are available and may, if necessary, inform the user that a different interface card must be installed in the mobile device 205 to allow access. If mobile device 205 is, for example, within the region for network A3 230 and is in the process of moving out of the region served by the network, the device may inform the user of the imminent change in service and may take action to complete transactions or cache data in anticipation of a loss of service. If mobile device 205 moves in a direction that will take the device out of the city and into an area of no service 260, the device may warn the user of the anticipated loss of service and, if appropriate, may cache data in order to minimize potential data loss, minimize disruption of service, or improve the performance of an application.

In FIG. 2, the mobile device 205 may be carried by airplane from the city A airport 235, which is served by a particular wireless local area network, to the city B airport 255, which is served by another wireless local area network. According to one embodiment, the user of the device may input the destination of the flight into the mobile device 205. In this manner, the mobile device 205 may access the coverage map prior to the flight to anticipate the communications service options available at the end of the flight, which in this particular example would be the WLAN serving the city B airport 255 as well as the GPRS cellular service serving the region of city B 215. If the mobile device 205 then subsequently moves in a direction that will leave the region of the WLAN serving city B airport 255, the mobile device 205 then will anticipate service changes, including the loss of service from the WLAN serving the region of the city B airport 255. The service changes may include entering the regions served by other networks, including the networks shown in FIG. 2 as network B1 240, network B2 245, and network B3 250.

The storage location and method of access of a communications service coverage map for a mobile device is dependent on the particular embodiment of the invention. According to one embodiment of the invention, the coverage map is stored in the mobile device and may be directly accessed. In another embodiment, the coverage map is stored on a server and the device accesses the map on the server. In another embodiment, the coverage map is stored in a location other than the mobile device and all or a relevant portion of the coverage map is downloaded to the device as needed. The timing and circumstances for coverage map downloads may vary. For example, a portion of a map may be downloaded proactively in anticipation of a change in location to a different city, or a portion of a map may be downloaded on demand as the mobile device needs the information. Under certain embodiments of the invention, the coverage map is provided as a part of a communication service provided for mobile devices. Under one embodiment of the present invention, a mobile device requests communications assistance and one or more assistance providers may provide coverage map services to the mobile device.

Under one embodiment of the invention, a mobile device may be traveling between areas with various communication services available. The services may include cellular telephone and other forms of communication services over longer distances. In other embodiments of the invention, the services may include services over shorter distances, including but not limited to wireless ethernet networks, such as those under the Institute of Electrical and Electronics Engineers (IEEE) standard 802.11b for wireless local area networks (WLAN) (IEEE, September 1999), and wireless communications protocols such as Bluetooth. A mobile device may move in and out of the regions served by various communications networks, thereby allowing or requiring the mobile device to change network connections as the device moves.

According to one embodiment of the invention, a mobile device will utilize anticipated communications service changes to obtain an optimal connection. A mobile device may be moving towards an area in which multiple possible services may be utilized. The nature of an optimal connection varies and is dependent on the current operation. For example, if a mobile device is being used for a large amount of data transmission, an optimal connection may relate to the highest speed and reliability of data transfer. If a device is being used for instant messaging, the optimal connection may relate to retention of a service that will support the instant messaging application. If a device is used for a telephone call, the optimal connection may be the option that provides the least expensive communication.

The communication regions and venues encountered by a mobile device operating under an embodiment of the invention may vary widely. In one embodiment of the invention, different areas within a single building may constitute separate communication networks. In one embodiment of the invention, a particular cellular network may encompass a large geographic area. In some embodiments of the invention, the communication venues may overlap, with more than one network available at a particular location. For example, various cellular communication networks may be available simultaneously. In another example, a mobile device may be capable of communicating with a cellular communication network or a wireless local area network in the same region.

As communications service changes are anticipated, various actions may be taken by a network or a mobile device to accommodate the anticipated service changes. The actions that are taken may vary depending on the type of change in service that is anticipated. In one embodiment of the invention, a mobile device may provide a warning to the user of the device and/or to active applications if the mobile device is moving towards a region without service coverage or with reduced service availability. The warning enables the user to take proactive actions, which may include stopping until a communication is completed or changing direction of movement to remain in a service area. In one embodiment of the invention, a mobile device may provide a message to the user informing the user that the user needs to take certain action in order for communications to continue. For example, if a mobile device is operating in a wireless ethernet network utilizing an IEEE 802.11b interface card, the mobile device may, if necessary, inform the user of the need to remove the card and insert another card in order for the mobile device to operate in a new area.

In certain embodiments of the invention, actions may be taken automatically if a change in service is anticipated. A mobile device may prepare for a transfer to a different communications service if possible. Under one embodiment of the invention a mobile device may automatically begin caching data if it is anticipated that service may be lost or service may be reduced in order to minimize the loss of data.

In one embodiment of the invention, a mobile device may communicate with more than one network at the same time, or communicate with multiple services in an overlapping manner. For example, a mobile device may be in communication with a network that maintains a coverage map for the device. Without severing the communication link with the coverage map network, the device may communicate with other communication services. In one particular example, the mobile device maintains contact with a service that provides a service coverage map for the device or the mobile device periodically makes contact with such a service, while the device also is in contact with another communications service. In this example, a service that provides the coverage map is utilized to obtain necessary data regarding anticipated service changes, while other services are used for other communications functions for the mobile device.

Figure 3:
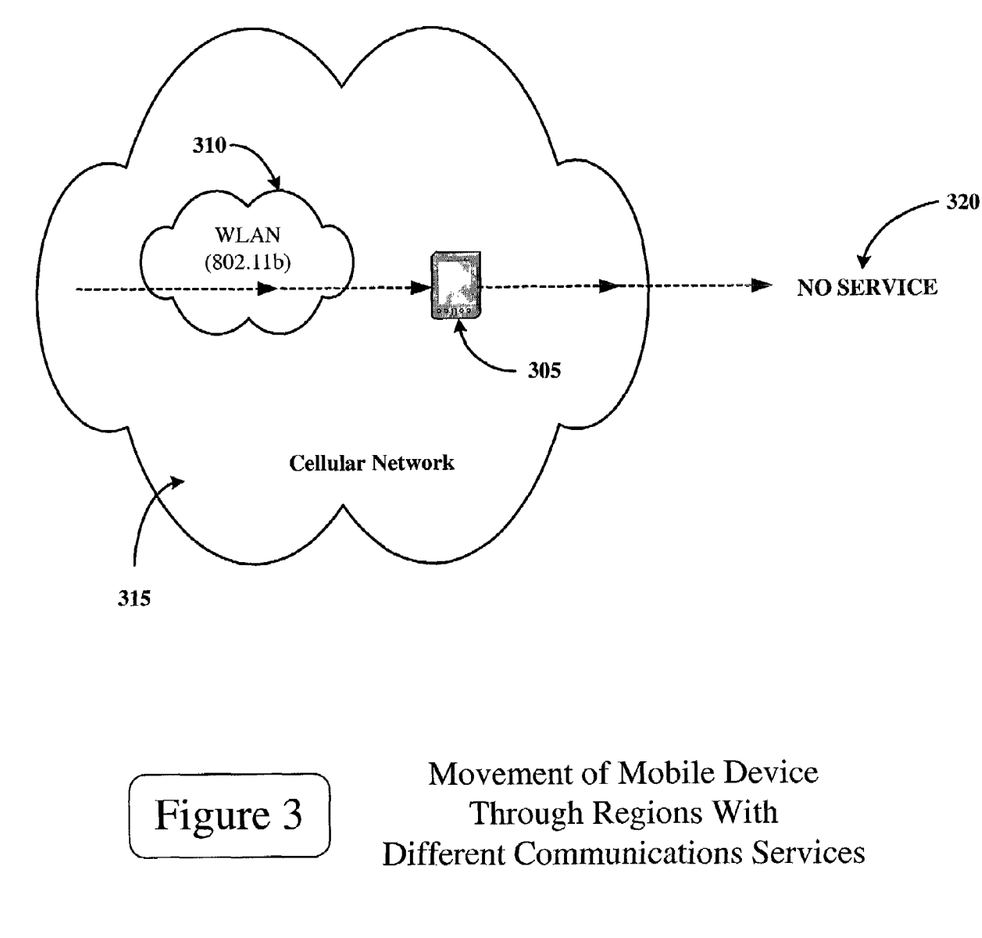
FIG. 3 illustrates movement of a mobile device through different network areas under an embodiment of the invention.

FIG. 3 is an illustration of a mobile device 305 that is traveling along a particular path. In this illustration, mobile device 305 is initially located in a region that is served by a cellular telephone network 315. If the mobile device 305 moves along the path illustrated, the device will enter a region served by a wireless local area network (WLAN) 310. In this example, the mobile device 305 will detect the current location and direction of travel of the device and, upon looking ahead on a service coverage map for the device, will determine that the device is nearing a region in which access to the WLAN 310 is also available. As an example, the user of the device may be entering a facility, such as a university, a corporate campus, a museum, or a public building, in which a special network is provided. The mobile device 305 may notify the user of the device that access to the WLAN 310 is available to allow the user to access the network if desired. In this environment, the device may, if necessary, prompt the user to install a network interface card that will enable communication with the WLAN 310, or running applications may be notified that a faster link is available.

If mobile device 305 continues along the path illustrated in FIG. 3, the device will eventually leave the region served by WLAN 310. Under the illustrated embodiment of the invention, the current location and direction of travel of the mobile device 305 is determined periodically. If, based upon the current location of the device and the direction in which the device is traveling, it is determined that the device will move out of the region served by the WLAN 310 in the near future and thus that a loss in the service provided by the network may occur soon, the device may warn the user of the potential change in service. The mobile device 305 may take other actions to accommodate the service change, such as pre-fetching data, caching data, or switching a mode of operation. In this example the mobile device 305 will be moving out of a region served by the WLAN 310 but will remain in the region served by cellular network 315. In this example, the mobile device 305 may prompt the user of the device to change a network card in the device to allow communication with the cellular network 315.

If mobile device 305 in FIG. 3 then continues along the illustrated path the device will reach a no service region 320 in which the communications link will be lost. While moving along this path, the mobile device 305 determines the current location and direction of travel of the device. In this example, if the mobile device 305 determines that the device is moving towards the no service region 320 and that the device is near enough that loss of service may occur, then the device may warn the user and/or active applications that loss of service is imminent. In response to the warning, the user of mobile device 305 may then end the user's communication or may take action to avoid loss of service, such as stopping or changing direction if possible. Under a particular embodiment of the invention, the speed of travel of the mobile device 305 is determined in addition to the location and direction of travel of the device. The additional information provided by the speed of travel data may be used by the mobile device 305 to determine how much time will pass before the device reaches a point at which a change in service will occur, which information may then be used to adjust when any action will be taken in connection with an anticipated change in service.

Figure 4:
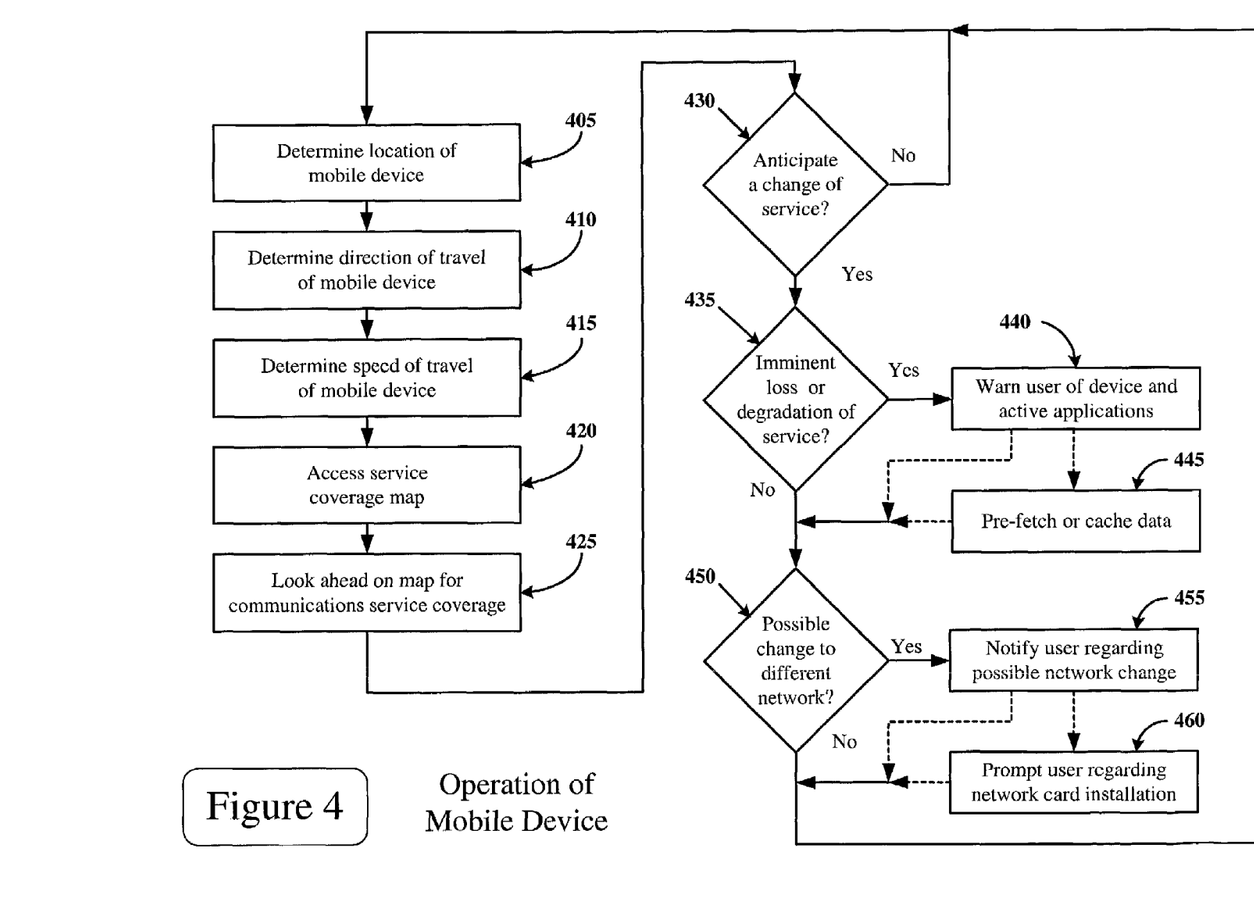
FIG. 4 is a flow chart showing the operation of a mobile device under an embodiment of the invention.

The operation of a mobile device under an embodiment of the invention is illustrated by the flow chart contained in FIG. 4. The current location of a mobile device is determined, process block 405, and the direction of travel is determined, process block 410. The determination of location and direction of travel may be made by any known method. Under a particular embodiment of the invention, the speed of travel of the mobile device is also determined, process block 415. The mobile device accesses a service coverage map, process block 420, that links communications service coverage with location. The storage location of the map may vary with the particular embodiment of the invention. The service coverage map may be stored in the mobile device, in a server, or in other locations. Based on the location and direction of travel of the mobile device and possibly based additionally on the speed of travel of the mobile device, the mobile device looks ahead on the service coverage map, process block 425, and determines what service coverage is anticipated for the mobile device.

The actions taken by the mobile device to accommodate an anticipated change in service depend on the embodiment and the particular types of service changes that are encountered. For example, if a change in communications service is anticipated, process block 430, the actions taken by the mobile device are dependent on what type of change is anticipated. If an imminent loss or degradation in service is anticipated, process block 435, the mobile device may warn the user of the device and the active applications running on the device, process block 440. If necessary, the mobile device may also pre-fetch or cache data, process block 445, to minimize the chances of data loss if communications service is lost or to minimize application disruption. If the mobile device determines that the device can change to a different network, the device may notify the user of the device, process block 455. If necessary, the mobile device may also prompt the user to install a network interface card that will allow communication with the new network, process block 460. If no change in service is anticipated, process block 430, or if the actions connected with a anticipated change in service are completed, the process returns to the determination of the current location, direction of travel, and speed of travel of the mobile device, process blocks 405, 410, and 415. Note that this example is simplified and that numerous other potential communications service changes are possible and other courses of action may be taken by a mobile device to accommodate a communications connectivity change.

Figure 5:
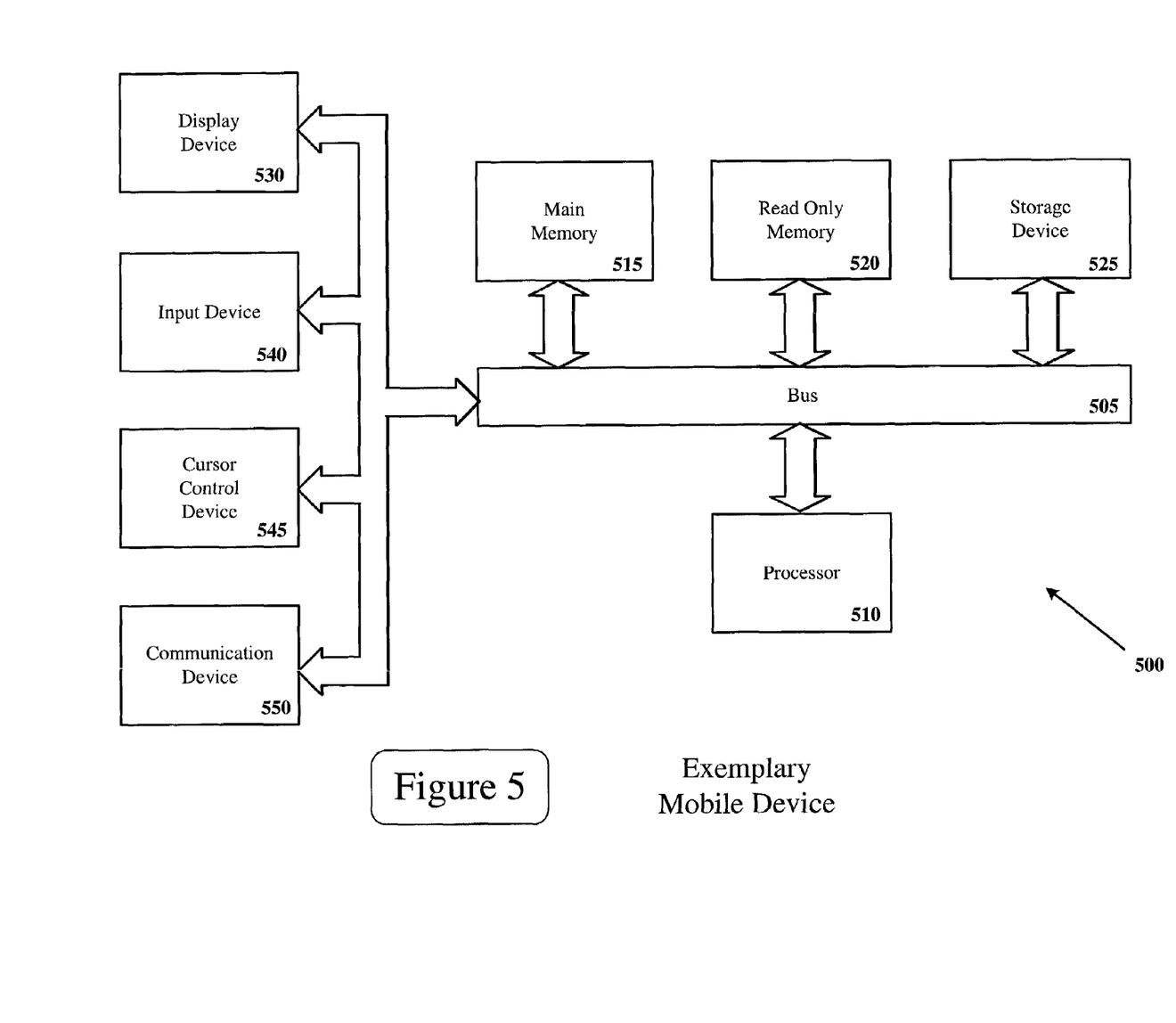
FIG. 5 is a block diagram illustrating an exemplary mobile device that may be utilized in connection with an embodiment of the invention.

FIG. 5 is a block diagram illustrating an exemplary mobile device that may be utilized under an embodiment of the invention. Not all mobile devices are structured as shown in FIG. 5. In addition, certain mobile devices may utilize elements shown in FIG. 5 as auxiliary devices that are external from the mobile device. Under an embodiment of the invention, a mobile device 500 comprises a bus 505 or other communication means for communicating information, and a processing means such as a processor 510 coupled with the bus 505 for processing information. The mobile device 500 further comprises a random access memory (RAM) or other dynamic storage device as a main memory 515 for storing information and instructions to be executed by the processor 510. Main memory 515 also may be used for storing temporary variables or other intermediate information during execution of instructions by the processor 510. The mobile device 500 also may comprise a read only memory (ROM) 520 and/or other static storage device for storing static information and instructions for the processor 510.

A data storage device 525 may also be coupled to the bus 505 of the mobile device 500 for storing information and instructions. The data storage device 525 may include a magnetic disk or optical disc and its corresponding drive, flash memory or other nonvolatile memory, or other memory device. The mobile device 500 may also be coupled via the bus 505 to a display device 530, such as a liquid crystal display (LCD) or other display technology, for displaying information to an end user. In some environments, the display device may be a touch-screen that is also utilized as at least a part of an input device. In some environments, display device 530 may be or may include an auditory device, such as a speaker for providing auditory information. An input device 540 may be coupled to the bus 505 for communicating information and/or command selections to the processor 510. In various implementations, input device 540 may be a keyboard, a keypad, a touch-screen and stylus, a voice activated system, or other input device, or combinations of such devices. Another type of user input device that may be included is a cursor control device 545, such as a mouse, a trackball, or cursor direction keys for communicating direction information and command selections to processor 510 and for controlling cursor movement on display device 530.

A communication device 550 may also coupled to the bus 505. Depending upon the particular implementation, the communication device 550 may include a transceiver, a wireless modem, a network interface card, or other interface device to provide a communication link. The mobile device 500 may be linked to a network or to other devices using the communication device 550, which may include links to the Internet, a local area network, or another environment.

The invention has been described in terms of several embodiments. However, those skilled in the art will recognize that the invention is not limited to the embodiments described, but rather that modifications and changes may be made without departing from the broader spirit and scope of the invention. The specification and drawings are thus to be regarded as illustrative rather than limiting.

What is claimed is:

1. A mobile device comprising:
   a processor to process communications operations, the processor to automatically determine a location and a direction of travel for the mobile device based on received signals;
   a communications link with one or more wireless networks; and
   a memory, wherein data stored in the memory includes data regarding the determined location and the determined direction of travel of the mobile device, wherein the mobile device is to anticipate changes in communications service availability for the mobile device based at least in part on the determined location and direction of travel of the mobile device;
   wherein the mobile device is to initiate one or more actions to accommodate an anticipated change in communications service availability.

2. The mobile device of claim 1, wherein the mobile device is to access a service coverage map to determine the anticipated changes in communications service availability for the mobile device.

3. The mobile device of claim 2, wherein the service coverage map is stored on the mobile device.

4. The mobile device of claim 2, wherein the service coverage map is stored outside the mobile device and the service coverage map is referenced as needed to anticipate changes in communications service availability.

5. The mobile device of claim 1, wherein the processor of the mobile device is to further determine a speed of travel of the mobile device, and wherein the anticipation of changes in communications service availability for the mobile device is also based at least in part on the speed of travel of the mobile device.

6. The mobile device of claim 1, wherein the mobile device is to provide a warning regarding anticipated changes in communications service availability.

7. The mobile device of claim 1, wherein the actions to anticipate a change in communications service availability include performing one or more of the following actions prior to the anticipated change:
   saving application data;
   pre-fetching application data; or
   switching a mode of operation.

8. The mobile device of claim 1, wherein the actions to anticipate a change in communications service availability include prompting a user to install hardware needed for the anticipated change in communications service availability.

9. A method comprising:
   automatically determining the location of a mobile device and a direction in which the mobile device is moving, the determination of the location and direction being made by the mobile device based upon radio signals received by the mobile device;
   anticipating a change in communications service availability for the mobile device, the mobile device anticipating the change in communications service availability based at least in part on the determined location of the mobile device and direction in which the mobile device is moving; and
   initiating one or more actions by the mobile device to accommodate the anticipated change in communications service availability.

10. The method of claim 9, wherein the anticipation of the change in communications service availability is made by the mobile device using a map of communications service coverage for the mobile device.

11. The method of claim 9, further comprising the mobile device determining a speed at which the mobile device is moving and basing the anticipated change in communications service availability at least in part on the speed of movement of the mobile device.

12. The method of claim 9, further comprising the mobile device providing a warning regarding the anticipated change in communications service availability.

13. The method of claim 9, wherein the one or more actions initiated by the mobile device to accommodate the anticipated change in communications service availability include one or more of the following:
   caching application data;
   pre-fetching application data;
   switching a mode of operation; or prompting a user to install hardware needed for the anticipated change in communications service availability.

14. A machine-readable medium having stored thereon data representing sequences of instructions that, when executed by a processor of a mobile device, cause the processor to perform operations comprising:
    determining the location of the mobile device and a direction in which the mobile device is moving, the mobile device making the location and direction determinations based on signals received by the mobile device;
    anticipating a change in communications service availability for the mobile device based at least in part on the location of the mobile device and direction in which the mobile device is moving; and
    initiating one or more actions to accommodate the anticipated change in communications service availability.

15. The medium of claim 14, wherein the anticipation of the change in communications service availability is made using a map of communications service coverage for the mobile device.

16. The medium of claim 14, further comprising instructions that, when executed by the processor of the mobile device, cause the processor to perform operations comprising determining a speed at which the mobile device is moving and basing the anticipation of the change in communications service availability at least in part on the speed of movement of the mobile device.

17. The medium of claim 14, further comprising instructions that, when executed by the processor of the mobile device, cause the processor to perform operations comprising providing a warning regarding the anticipated change in communications service availability.

18. The medium of claim 14, wherein the one or more actions initiated prior to the anticipated change in communications service availability include one or more of the following:
    caching application data;
    pre-fetching application data;
    switching a mode of operation; or
    prompting a user to install hardware needed for the anticipated change in communications service availability.

19. A mobile device comprising:
    a means for the mobile device to automatically determine the location and direction of travel of the mobile device based on radio signals received by the mobile device;
    a means for accessing a service coverage map, the service coverage map including data regarding communications service availability at a plurality of locations;
    a means for the mobile device to anticipate changes in communications service availability for the mobile device, the anticipation being based at least in part on the location and direction of travel of the mobile device; and
    a means for the mobile device to initiate one or more actions to accommodate an anticipated change in communications service availability.

20. The mobile device of claim 19, further comprising a means for the mobile device to determine a speed of travel of the mobile device.

21. The mobile device of claim 20, wherein the means for anticipating changes in communications availability is to base the anticipation of a change in communications service availability for the mobile device at least in part on the speed of travel of the mobile device.

22. The mobile device of claim 19, further comprising a means for the mobile device to provide a notice regarding an anticipated change in communications service availability.

23. The mobile device of claim 19, wherein the one or more actions to be initiated by the mobile device in anticipation of the change in communications service availability include one or more of the following:
    caching application data;
    pre-fetching application data;
    switching a mode of operation; or
    prompting a user to install hardware needed for the anticipated change in communications service availability.

24. A communications system comprising:
    a mobile device, the mobile device communicating using a wireless communications link, the mobile device to automatically determine a location and a direction of travel for the mobile device based on received global positioning satellite (GPS) signals;
    a plurality of communications services for the mobile device; and
    a map of communications services for the mobile device, the map of communications services containing data regarding the communications services available to the mobile device at certain locations, the map being used by the mobile device to anticipate changes in availability of communications connectivity for the mobile device based at least in part on the location and the direction of travel of the mobile device;
    wherein the mobile device is to initiate one or more actions to accommodate an anticipated change in communications service availability.

25. The communications system of claim 24, wherein the anticipation of changes in availability of communications connectivity is also based at least in part on a speed of travel of the mobile device.

26. The communications system of claim 24, wherein the mobile device is to provide a warning regarding anticipated changes in availability of communications connectivity.

27. The communications system of claim 26, wherein the mobile device is to provide the warming to a user of the mobile device.

28. The communications system of claim 26, wherein the mobile device is to provide the warming to an application running on the mobile device.

29. The communications system of claim 24, wherein the one or more actions to be initiated in anticipation of the change in availability of communications connectivity include one or more of the following:
    caching data;
    pre-fetching data;
    switching a mode of operation; or
    prompting a user to install hardware needed for the anticipated change in communications service availability.

30. The mobile device of claim 1, wherein the received signals comprise global positioning satellite (GPS) signals.

31. The method of claim 9, wherein the received radio signals comprise global positioning satellite (GPS) signals.

32. The medium of claim 14, wherein the received signals comprise global positioning satellite (GPS) signals.

33. The mobile device of claim 19, wherein the radio signals received by the mobile device comprise global positioning satellite (GPS) signals.

34. A mobile device comprising:
a processor to process communications operations;
a communications link with one or more wireless networks; and
a memory, wherein data stored in the memory includes data regarding a location and a direction of travel of the mobile device, wherein the mobile device is to anticipate changes in communications service availability for the mobile device based at least in part on the location and direction of travel of the mobile device;
wherein the mobile device is to initiate one or more actions to accommodate an anticipated change in communications service availability, the actions including performing one or more of the following actions prior to an anticipated change in communications service availability:
saving application data;
pre-fetching application data;
switching a mode of operation; or
prompting a user to install hardware needed for an anticipated change in communications service availability.

\* \* \* \* \*